Figures 1, 2, 3:
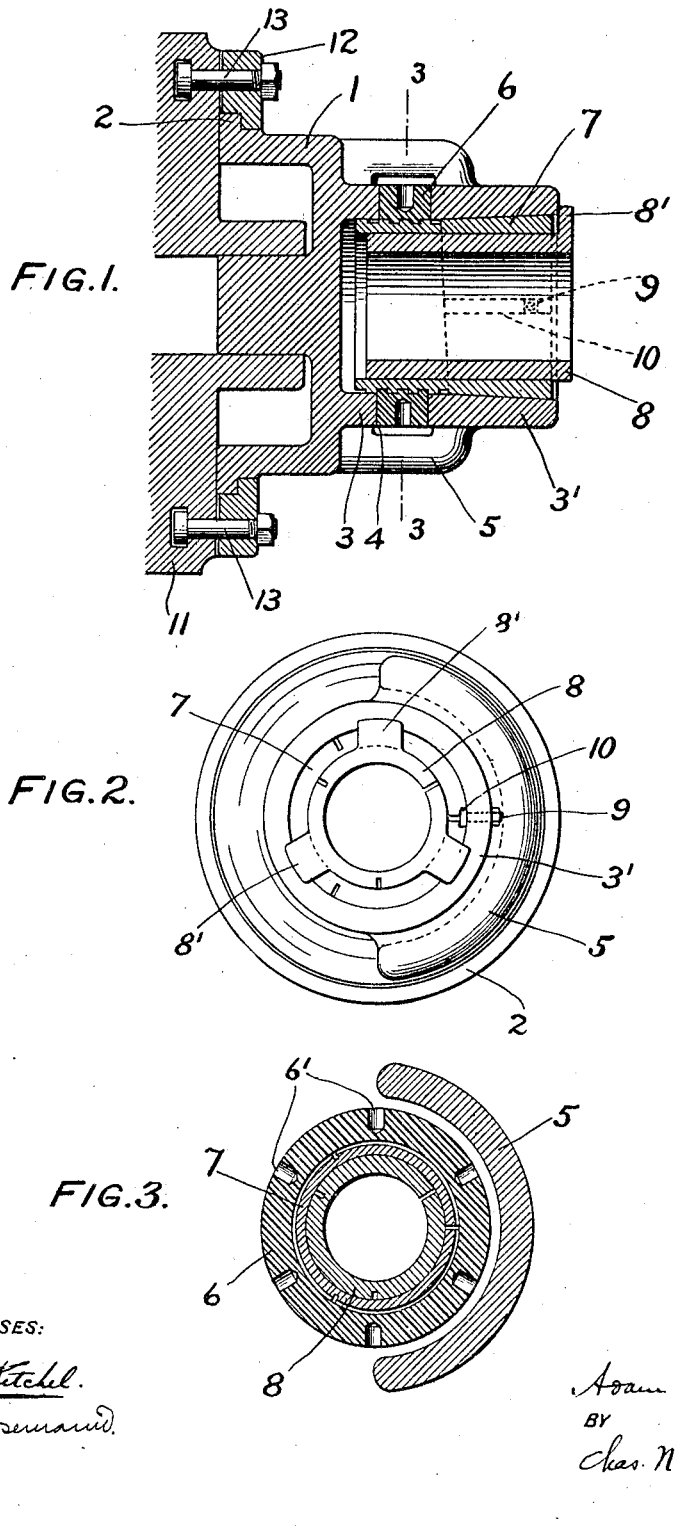

No. 871,005. PATENTED NOV. 12, 1907.
A. TINDEL.
CHUCK MECHANISM.
APPLICATION FILED APR. 4, 1907.

WITNESSES:

INVENTOR

BY

ATTORNEY.

UNITED STATES PATENT OFFICE.

ADAM TINDEL, OF PHILADELPHIA, PENNSYLVANIA, ASSIGNOR TO TINDEL-MORRIS COMPANY, OF EDDYSTONE, PENNSYLVANIA, A PENNSYLVANIA CORPORATION.

CHUCK MECHANISM.

No. 871,005.   Specification of Letters Patent.   Patented Nov. 12, 1907.

Application filed April 4, 1907. Serial No. 366,371.

*To all whom it may concern:*

Be it known that I, ADAM TINDEL, a citizen of the United States, and resident of Philadelphia, in the county of Philadelphia and State of Pennsylvania, have invented certain Improvements in Chuck Mechanisms, of which the following is a specification.

This invention is an improved chuck mechanism having as its leading object to hold crank shafts and eccentric shafts in turning lathes while turning the crank or wrist pins or eccentric parts of such shafts.

Heretofore it has been found very difficult to hold firmly the end of such crank and eccentric shafts to obtain and maintain accuracy in the centering of the wrist pins or eccentrics and to prevent end-thrust or pull on such pieces in centering; whereby the crank pins or eccentrics are sprung or bowed and thrown out of alinement, rendering true turning impossible.

The present improvements provide a very simple construction by which the shaft ends can be firmly gripped and the pins or eccentrics centered accurately without any of the usual tendency to draw them out of center by thrust or stretch of the shaft in tightening the chuck.

In the accompanying drawings, Figure 1 represents a longitudinal section of chuck mechanism constructed according to my invention; Fig. 2 represents an end view of the same, and Fig. 3 represents a sectional view on the line 3—3 of Fig. 1.

The chuck comprises a base 1 having thereon the flange 2 and the ferrule or thimble composed of the parts 3, 3'; the parts 3, 3' being separated by the circular recess 4 and connected by the outwardly swelled semi-cylindrical bracket 5. The recess and bracket provide a throat for inserting and a seat for holding a nut 6 containing the holes 6' for inserting a key to turn it. The interior surface of the ferrule member 3 is cylindrical while that of the member 3' is conical, and in the socket thereby formed is placed a flexible sleeve 7 having its inner part provided with a threaded cylindrical surface for engagement by the nut 6 and its outer part provided with a conical surface corresponding to the interior surface of the part 3'. Within the sleeve 7 is placed a flexible split sleeve 8 of cylindrical form. This sleeve is provided with the lugs 8' which engage the ferrule member 3' so that when the nut 6 is turned to move the sleeve 7 axially, the sleeve 8 will be drawn up without longitudinal movement. A bolt 9 is set in the ferrule member 3' and is adapted for engaging a channel 10 in the sleeve 7 to prevent the latter from turning and turning the sleeve 8.

The base 1 is supported upon the seat 11 where it is held in revoluble relation by clips 12 which engage the flange 2 and are secured by the bolts 13.

This construction provides a chuck mechanism that will hold the ends of a crank shaft rigidly during the movement of the sleeve 7 by the nut 6 without causing any longitudinal movement in the sleeve 8 and permits the necessary gripping operation to be effected without straining the shaft longitudinally or twisting it. The shaft thus gripped can be adjusted to center the pins by loosening the clips 12, revolving the chuck and clamping it in the desired position.

Having described my invention, I claim:—

1. A chuck mechanism comprising a ferrule having a recess and a tapered surface, a nut seated in said recess, a split sleeve having a screw thread engaged by said nut and a tapered surface engaged by the tapered surface of said ferrule, a split sleeve within the aforesaid split sleeve, and means whereby said inner sleeve is held against inward movement with said first named sleeve.

2. A chuck mechanism having a base with a ferrule thereon, said ferrule being divided by a recess and having the divided parts thereof connected by an outwardly swelled member, a nut revoluble in said recess, a compressible sleeve movable longitudinally in said ferrule by means of said nut, means for preventing said sleeve from revolving in said ferrule, and a second compressible sleeve within said first sleeve, said second sleeve having means for engaging said ferrule and holding it against inward movement with said first sleeve.

3. A chuck mechanism comprising, in combination with a seat, holding members secured thereto, a base engaged in revoluble relation to said seat by said holding members, a ferrule on said base, a nut seated within said ferrule, a compressible sleeve movable longitudinally in said ferrule by means of said nut, and a second compressible sleeve within said first named sleeve, said second sleeve having a lug or lugs for engaging said ferrule.

In testimony whereof, I have hereunto set my name this 30th day of March, 1907, in the presence of the subscribing witnesses.

ADAM TINDEL.

Witnesses:
G. N. CRISPIN,
W. ELLIOTT HAZZARD.